(12) United States Patent
Lintz et al.

(10) Patent No.: US 12,298,500 B2
(45) Date of Patent: May 13, 2025

(54) SWITCHABLE VIEW IMAGING SYSTEM (71) Applicant: GENTEX CORPORATION, Zeeland, MI (US)

(72) Inventors: Joshua D. Lintz, Allendale, MI (US); Kurtis L. Geerlings, Zeeland, MI (US); Xiaoxu Niu, Grand Rapids, MI (US); Matthew W. Remijn, Grand Rapids, MI (US); Adam R. Heintzelman, Grand Rapids, MI (US); Ryan B. Balili, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 715 days.

(21) Appl. No.: 17/618,602

(22) PCT Filed: Jun. 10, 2020

(86) PCT No.: PCT/US2020/036961
§ 371 (c)(1),
(2) Date: Dec. 13, 2021

(87) PCT Pub. No.: WO2020/251996
PCT Pub. Date: Dec. 17, 2020

(65) Prior Publication Data
US 2022/0244531 A1 Aug. 4, 2022

Related U.S. Application Data (60) Provisional application No. 62/860,985, filed on Jun. 13, 2019.

(51) Int. Cl.
*G02B 27/00* (2006.01)
*B60R 1/28* (2022.01)
(Continued)

(52) U.S. Cl.
CPC ............ *G02B 27/0081* (2013.01); *B60R 1/28* (2022.01); *G02B 27/141* (2013.01);
(Continued)

(58) Field of Classification Search
CPC .............. G02B 27/0081; G02B 27/141; G02B 27/283; H04N 13/211; H04N 13/296; B60R 1/28; G02F 1/0136
(Continued)

(56) References Cited

U.S. PATENT DOCUMENTS 5,748,390 A 5/1998 Koiwai et al.
7,061,532 B2 6/2006 Silverstein
(Continued)

FOREIGN PATENT DOCUMENTS

CN 103210348 A 7/2013
CN 103827730 A 5/2014
(Continued)

OTHER PUBLICATIONS

Machine Translation of JP 2004229080 (Year: 2024).*
(Continued)

*Primary Examiner* — James E Springer
(74) *Attorney, Agent, or Firm* — Price Heneveld LLP; Brian James Brewer (57) ABSTRACT

An imaging system may comprise a first lens and a second lens; at least one light valve; and an image sensor in optical communication with the light valve. The first lens may be in optical communication with the light valve; and the second lens may be in optical communication with the light valve. The light valve may be configured to have a first polarization state and a second polarization state. The first polarization state may allow light to pass through the light valve and the second polarization state may reflect light that strikes the light valve.

19 Claims, 5 Drawing Sheets (51) Int. Cl.
  *G02B 27/14*  (2006.01)
  *G02B 27/28*  (2006.01)
  *G02F 1/01*  (2006.01)
  *H04N 13/211*  (2018.01)
  *H04N 13/296*  (2018.01)

(52) U.S. Cl.
  CPC ......... *G02B 27/283* (2013.01); *G02F 1/0136* (2013.01); *H04N 13/211* (2018.05); *H04N 13/296* (2018.05)

(58) Field of Classification Search
  USPC .......................................................... 348/49
  See application file for complete search history.

(56) References Cited

U.S. PATENT DOCUMENTS

| | | | |
|---|---|---|---|
| 9,389,498 | B2 | 7/2016 | Inomoto |
| 9,420,220 | B2 | 8/2016 | Nieten et al. |
| 10,434,948 | B2 | 10/2019 | Tonar et al. |
| 10,506,145 | B2 | 12/2019 | Takama et al. |
| 2002/0140835 | A1 | 10/2002 | Silverstein |
| 2009/0128664 | A1 | 5/2009 | He et al. |
| 2011/0249175 | A1 | 10/2011 | Lo |
| 2012/0140047 | A1 | 6/2012 | Yamashita |
| 2013/0027873 | A1 | 1/2013 | Chen et al. |
| 2014/0184877 | A1 | 7/2014 | Ahn et al. |
| 2015/0055120 | A1 | 2/2015 | Le et al. |
| 2016/0036095 | A1 | 2/2016 | Ogg |
| 2016/0165157 | A1 | 6/2016 | Stein et al. |
| 2016/0373684 | A1 | 12/2016 | Sherman et al. |
| 2017/0064175 | A1 | 3/2017 | Furutake |
| 2018/0103218 | A1 | 4/2018 | Stein et al. |
| 2021/0110401 | A1* | 4/2021 | Tsui ................. G06Q 20/20 |
| 2021/0309182 | A1* | 10/2021 | Ragunathan ......... G06V 40/166 |

FOREIGN PATENT DOCUMENTS

| | | | | |
|---|---|---|---|---|
| CN | 107153316 | A | 9/2017 | |
| CN | 107472140 | A | 12/2017 | |
| CN | 109219775 | A | 1/2019 | |
| CN | 109270659 | A | 1/2019 | |
| DE | 102011106453 | A1 | 1/2013 | |
| JP | 2003158650 | A | 5/2003 | |
| JP | 2004229080 | A * | 8/2004 | |
| JP | 2005505950 | A | 2/2005 | |
| JP | 2012124625 | A | 6/2012 | |
| JP | 2013222177 | A | 10/2013 | |
| JP | 2014110584 | A | 6/2014 | |
| JP | 201914286 | A | 1/2019 | |
| WO | WO-2007090896 | A1 * | 8/2007 | ............. B60K 28/02 |
| WO | 2018112292 | A1 | 6/2018 | |

OTHER PUBLICATIONS

International Preliminary Report on Patentability dated Dec. 14, 2021, for corresponding PCT application No. PCT/US2020/036961, 4 pages.
International Search Report dated Sep. 10, 2020, for corresponding PCT application No. PCT/US2020/ 036961, 2 pages.
Written Opinion dated Sep. 10, 2020, for corresponding PCT application No. PCT/US2020/036961, 3 pages.
China Office Action dated Aug. 7, 2023, for corresponding China application No. 202080042108.0, 8 pages.
China Search Report dated Aug. 4, 2023, for corresponding China application No. 2020800421080, 4 pages.
Extended European Search Report dated Aug. 29, 2022, for corresponding European application No. 20823184.5, 10 pages.
Japanese Office Action dated Jan. 16, 2023, for corresponding Japanese application No. 2012-573461, 4 pages.

* cited by examiner

SWITCHABLE VIEW IMAGING SYSTEM

CROSS REFERENCE TO RELATED APPLICATIONS

This application claims the benefit of and priority to U.S. Provisional Patent Application No. 62/860,985, filed on Jun. 13, 2019, entitled Switchable View Imaging System, and Patent Cooperation Treaty (PCT) Patent Application No. PCT/US2020/036961 filed on Jun. 10, 2020, entitled Switchable Multi-View Imaging System, the entire disclosures of which are hereby incorporated by reference.

FIELD OF THE DISCLOSURE

This disclosure relates generally to an imaging system, and in particular, to an imaging system with at least one of multiple fields of view, lines of sight, and focal distances.

BACKGROUND

Typically, image sensors that look at a large field of view may have a relatively poor resolution. These image sensors may be used in applications in vehicles such as back-up cameras or driver assist functions such as lane departure warnings. The image sensors used for these purposes may not be suitable for uses that require a high resolution. Similarly, image sensors having a high resolution may not be suitable for purposes requiring a large field of view, such as a back-up camera.

SUMMARY

According to an aspect, an imaging system may comprise at least a first lens and a second lens for imaging at least two different views; at least one light valve; and an image sensor in optical communication with the light valve. In some embodiments, the light valve may comprise a switchable reflective polarizer. In some embodiments, the light valve may comprise a reversible electroplated mirror. The first lens may be in optical communication with the light valve; and the second lens may be in optical communication with the light valve. The light valve may be configured to have a first polarization state and a second polarization state. The first polarization state may allow light to pass through the light valve and the second polarization state may reflect light that strikes the light valve.

The light valve may be configured to switch between two different multiple beam paths, actively choose different polarizations, select different bands of light, or direct multiple-paths to a single sensor. The light valve may be a switchable reflective polarizer capable of switching between at least a first and a second polarization state. The image sensor may be configured to interleave images received from the first lens and the second lens. When the light valve is in the first polarization state, the imaging system may be configured to cause images from the first lens to be transmitted to the image sensor. When the light valve is in the second polarization state, the imaging system may be configured to cause images from the second lens to be transmitted to the image sensor. The imaging system further may comprise at least one reflector; each of the at least one reflectors may be associated with one of the first and second lenses. The at least one reflector may be a first surface reflector. At least one of the at least one reflectors may be configured to re-direct images from the lens associated with the at least one reflector to the light valve. The first lens may have a different field of view from the second lens. The first lens may have a different focal length from the second lens.

According to an aspect, an imaging system may comprise a first lens; a first switchable shutter associated with the first lens; a second lens; a second switchable shutter associated with the second lens; and an image sensor in selective optical communication with both the first and the second lenses. The first and second switchable shutters may each comprise a plurality of independently controllable pixels; and turning a pixel on may allow light to pass through the pixel and may allow a particular segment of an image captured by the associated lens to be exposed to the image sensor; and turning a pixel off may prevent light from passing through the pixel.

The plurality of pixels in each of the first and second switchable shutters may be configured to be in sync with each other such that when a first pixel in one of the switchable shutters turns off, a second pixel in the same switchable shutter turns on. The plurality of pixels in the first and second switchable shutters may be configured to be in sync with each other such that when a first pixel on the first switchable shutter turns off, a first pixel in the second switchable shutter turns on. The first and second switchable shutters may be configured to alternate rapidly between a first state in which a first pixel of the first switchable shutter may be turned off, a second pixel of the first switchable shutter may be turned on, a first pixel of the second switchable shutter may be turned on, and a second pixel of the second switchable shutter may be turned off, and a second state in which a first pixel of the first switchable shutter may be turned on, a second pixel of the first switchable shutter may be turned off, a first pixel of the second switchable shutter may be turned off, and a second pixel of the second switchable shutter may be turned on. The image sensor may be configured to interleave images received from the first lens and the second lens.

The imaging system further may comprise at least one reflector; each of the at least one reflectors may be associated with one of the first and second lenses; and each of the at least one reflectors may be configured to direct light from the associated lens in a new direction. The at least one reflector may comprise at least one first surface reflector. The imaging system further may comprise at least one transflective reflector; the transflective reflector may be configured to allow light from the first lens and the first switchable shutter to pass through the transflective reflector; and the transflective reflector may be configured to reflect light coming from the second lens and the second switchable reflective shutter. The imaging system further may comprise an additional reflector; wherein the additional reflector may be configured to reflect light coming from the second lens and through the second switchable shutter to the transflective reflector. The first lens may have a different field of view from the second lens. The first lens may have a different focal length from the second lens.

According to another aspect, an imaging system may comprise a first lens configured to collect light from a first field of view; a second lens configured to collect light from a second field of view; a combiner; a polarization selector/rotator may comprise a liquid crystal element and a linear polarizer; and an imaging sensor in optical communication with each of the first and second lenses, the combiner, and the polarization selector/rotator. The combiner may comprise one of a transflective mirror, a reflective polarizing mirror, a polarizing beam splitter or combiner, a nonpolarizing beam splitter or combiner, or a dichroic mirror. The polarization selector/rotator may comprise a switchable waveplate.

The imaging system further may comprise a first linear polarizer in optical communication with the first lens and a second linear polarizer in optical communication with the second lens, and wherein the first linear polarizer and the second linear polarizer may be in optical communication with the combiner. The first linear polarizer may be configured to polarize light in a first direction; and wherein the second linear polarizer may be configured to polarize light in a second direction orthogonal to the first direction. The liquid crystal element may comprise an active switchable half-wave waveplate; and wherein the liquid crystal element may be configured to have a first state in which light polarized in a first direction can pass through the liquid crystal element and a second state in which light polarized in a second direction can pass through the liquid crystal element. The first direction may be orthogonal to the second direction. The polarization selector/rotator may be configured to polarize an incoming light beam. The first field of view at least partially overlaps with the second field of view. The combiner may comprise a polarizing beam splitter.

BRIEF DESCRIPTION OF THE DRAWINGS

FIG. 5 illustrates a diagram of another embodiment of the imaging system disclosed herein; and.

DETAILED DESCRIPTION

An imaging system in accordance with this disclosure may use a single image sensor with a plurality of lenses to select between different fields of view and/or different focal distances, thereby capturing different angles and different fields of view. The imaging system may be configured to allow the use of a multi-lens system to look at specific areas of interest, allowing the use of the entire image sensor for the areas, thereby allowing the processing of any images received by the image sensor without a loss of resolution.

The multi-lens arrangement may take up less space than two separate imaging systems while allowing the imaging system to serve multiple purposes. For example, in some embodiments, the component arrangement may allow the imaging system to use a single image sensor for capturing two or more images having two or more different fields of view, each field of view having a different size, and/or two or more different focal lengths while facing the same general direction. An example of this is an imaging system that may be used for biometric identification of a user, such as iris- or facial-recognition, and for monitoring selected characteristics of a user, such as, for example, a driver monitoring system. Another example is a component arrangement that allows the imaging system to display a first field of view focused at infinity and a second, near-field field of view, such as a rearview display system in a vehicle showing objects to the rear of vehicle in the distance and a back-up camera system that shows a scene immediately to the rear of vehicle. In some embodiments, the imaging system may use a single image sensor to capture images in fields of view that are in different directions. For example, the imaging system may capture a forward-facing image focused at infinity, then switch to capturing an image that is rear-facing and focused near-field, such as, for example, an imaging system configured to operate as both a forward-facing driver assist imaging system and a driver monitoring system. In some embodiments, the lenses, mirrors, and other components may be arranged to allow imaging system to capture images in a 360 degree radius.

Figure 1:
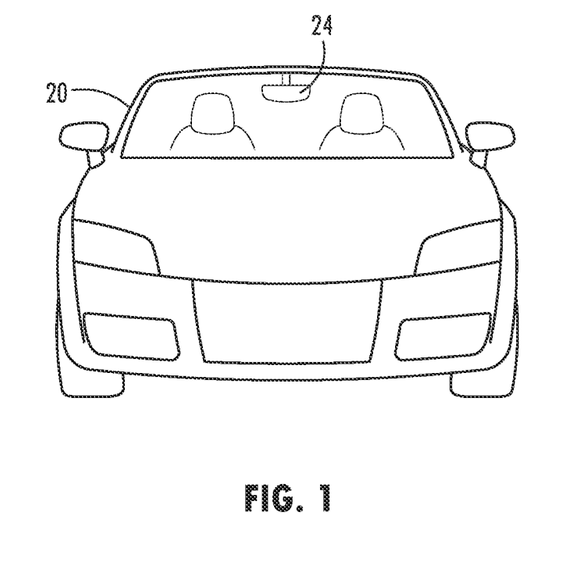
FIG. 1 illustrates a vehicle having a rearview assembly comprising a plurality of the components of the imaging system disclosed herein.

Referring to the FIGURES, in some embodiments, the imaging system, generally indicated at 10, may be disposed within a vehicle 20. However, imaging system 10 may be disposed in locations other than a vehicle and still remain within the scope of this disclosure. In some embodiments, components of imaging system 10 may be disposed within a rearview assembly 24 of vehicle 20 as shown in FIG. 1. In some embodiments, some components of imaging system 10 may be disposed within rearview assembly 24 of vehicle 20 while other components, such as one or more lenses, may be disposed elsewhere in vehicle 20, such as in a vehicle pillar, a vehicle dash board or infotainment console; or other suitable location within or on vehicle 20. The components disposed elsewhere may be in communication with those components of imaging system 10 disposed within rearview assembly 24 of vehicle 20. The components may be arranged so as to allow imaging system 10 to capture images of at least one of the driver or characteristics of a driver, the interior of the vehicle cabin, and a forward-facing view and/or a rear-facing view of the exterior of vehicle 20.

Figure 2A:
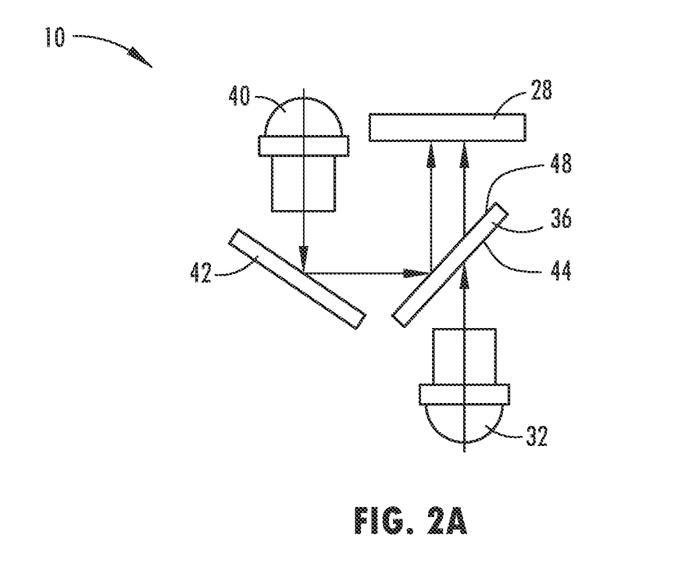
FIG. 2A illustrates a diagram of an embodiment of the imaging system disclosed herein.

In a first embodiment, as shown in FIG. 2, imaging system 10 may comprise an image sensor 28, at least a first lens 32, and a light valve 36. Imaging system 10 may also comprise at least a second lens 40. Imaging system 10 may further comprise at least one reflector 42. These components may be disposed in various arrangements to achieve the chosen objectives. In some embodiments, image sensor 28 may comprise active pixel sensors in complementary metal-oxide semiconductor (CMOS) devices or a charge-coupled device (CCD).

In some embodiments, light valve 36 may comprise a switchable reflective polarizer, and may include, for example, narrow to broadband cholesteric liquid crystals or electroplating/deplating technology. In some embodiments, light valve 36 may comprise a reversible electroplating mirror. In some embodiments, light valve 36 may comprise an active switchable absorptive filter, either neutral or chromatic, and may include, for example, an electro-optic window, an electro-optic window, or liquid crystal shutters. In some embodiments, light valve 36 may comprise a polarization selector and may include, for example, liquid crystal rotators coupled with absorptive or reflective polarizers. In some embodiments, light valve 36 may comprise three generally parallel layers: a first layer of liquid crystal, a second layer of a reflective polarizing mirror, and a third layer of liquid crystal. Light valve may comprise an anti-reflective coating on at least one of a first surface and a last surface to avoid reflecting unwanted light into image sensor 28. This may be desirable when light valve 36 is allowing light to pass through. The anti-reflective coating may ensure that only one image is reflected into image sensor 28.

First lens 32 may have a first focal length and may be positioned to capture images in a first field of view. First lens 32 may be configured to be in optical communication with image sensor 28 at least a portion of the time. The images captured by first lens 32 may be transmitted from first lens 32 toward image sensor 28. Light valve 36 may be disposed to selectively receive the images output by first lens 32, and to transmit the images received from first lens 32 to image sensor 28. In some embodiments, first lens 32 may be in intermittent optical communication with image sensor 28 as light valve 36 may alternate between two states: a first state in which light valve allows light from first lens 32 to strike image sensor 28 while preventing light from another lens or lenses from striking image sensor 28; and a second state in which light valve 36 prevents preventing light from first lens 32 from striking image sensor 28 while allowing light from another lens or lenses to strike image sensor 28.

Second lens 40 may have a second focal length and may be positioned to capture images in a second field of view. The second field of view may partially or completely coincide with the first field of view or it may be completely separate from the first field of view. In some embodiments, the second field of view may be in a direction generally opposite to the first field of view. The second field of view may be larger or smaller than the first field of view. The second focal length may be the same as the first focal length, longer than the first focal length, or shorter than the first focal length. For example, one lens may have a focal length and field of view that allows it to capture images from inside a vehicle cabin. Another lens may have a focal length and field of view that allows it to capture images exterior to vehicle 20.

Similar to first lens 32, second lens 40 may be configured to be in optical communication with image sensor 28 at least during a portion of an operational time period. In some embodiments, second lens 40 may be in intermittent optical communication with image sensor 28 as light valve 36 alternates between allowing light from second lens 40 to strike image sensor 28 and preventing light from second lens 40 from striking image sensor 28.

Light valve 36 may be capable of switching between a first polarization state and a second polarization state. The first and second polarization states may each comprise one of a reflective mode and a transmissive mode. In some embodiments, light valve 36 may comprise a liquid crystal element. Light valve 36 may comprise one or a plurality of independent pixels. Each pixel may be independently controllable to allow a particular segment of the captured image to be exposed to incoming light from a lens or to support a method of switching between frames when using a rolling shutter camera.

Light valve 36 may comprise a first surface 44 and a second surface 48. In the transmissive mode, light valve 36 may allow light to pass through from first surface 44 out through second surface 48 of light valve 36. This may enable light to pass, for example, from first lens 32 through light valve 36 and to image sensor 28. In the reflective mode, light valve 36 may prevent light from passing through light valve 36 and instead, may reflect incoming light that strikes second surface 48, sending it in a new direction. In some embodiments, in the second polarization state, light valve 36 may be configured to reflect incoming light to image sensor 28. Thus, in one polarization state, images captured from one lens, for example, first lens 32, may strike image sensor 28, while in another polarization state, images captured from a different lens, for example second lens 40, may strike image sensor 28. In this way, images from first lens 32 and second lens 40 may alternate in striking image sensor 28.

Image sensor 28 may be configured to receive light from both the first and second lenses 32, 40, but at different times. In some embodiments, light valve 36 may alternate between the first polarization state and the second polarization state. In this case, image sensor 28 may receive light alternately from first lens 32 and from second lens 40, and may be configured to interleave the images from first lens 32 and second lens 40. In some embodiments, light valve 36 may be capable of being synchronized with the start of exposure to a new frame on image sensor 28. Image sensor 28 may be configured to interleave images obtained from first lens 32 and from second lens 40, thereby allowing image sensor 28 to process images from both first and second lenses 32, 40, and to generate a complete image from each of first and second lenses 32, 40.

In some embodiments, second lens 40 may be configured to transmit captured images through light valve 36 toward image sensor 28 when light valve 36 is in the reflective mode. Images captured by second lens 40 may be reflected by light valve 36 and thereby directed to image sensor 28. In some embodiments, second lens 40 may be configured to transmit captured images to reflector 42, and reflector 42 may be configured to re-direct the images to light valve 36. Light valve 36 may be configured to re-direct incoming images to image sensor 28. Reflector 42 may comprise a first surface reflector to avoid having the possibility of double images.

In some embodiments, at least one optical filter (not shown) may be disposed between light valve 36 and first lens 32. In some embodiments, at least one optical filter (not shown) may be disposed between light valve 36 and second lens 40. In some embodiments, at least one first optical filter may be disposed between light valve 36 and first lens 32 and at least one second optical filter may be disposed between light valve 36 and second lens 40. The at least one optical filter may allow, for example, the filtering out of infrared light and/or the filtering out of ultraviolet light. This may allow for applications such as, for example, use of imaging system 10 at night for night driving.

In some embodiments, a third lens (not shown) may be disposed between image sensor 28 and light valve 36. This may allow the use of a lens that does not have a long back focal length.

In some embodiments, light valve 36 may be configured to operate in first polarization state for a period of time or until the occurrence of a first particular event, during which time images captured by first lens 32 may strike image sensor 28. After the period of time has elapsed or the first particular event has occurred, light valve 36 may begin operating in the second polarization state, allowing images captured by second lens 40 to strike image sensor 28. For example, rearview assembly 24 may be configured to authenticate a driver, then, once the driver has been authenticated, to monitor the driver. First lens 32 may capture a particular feature of the driver in a first field of view and having a first focal length to authenticate the driver. Light valve 36 may initially be in the transmissive state, and may allow the captured image from first lens 32 to pass through light valve 36 to reach image sensor 28. Once the driver has been authenticated, light valve 36 may switch to a reflective state. Second lens 40 may be configured to capture images of the driver for driver monitoring in a second field of view and may have a second focal length, and may transmit the captured images to light valve 36. Light valve 36 may allow the images captured by second lens 40 to be reflected to image sensor 28. In some embodiments, light valve 36 may be configured to revert to first polarization state after the occurrence of a second particular event. The second particular event may be the same event as the first particular event or it may be a different event. As used in the above example, the transmissive mode is the first polarization state and the reflective mode is the second polarization state, but imaging system 10 may be configured so that the reflective mode is the first polarization state and the transmissive mode is the second polarization state.

In some embodiments, imaging system 10 may comprise at least one second reflector (not shown). The at least one second reflector may be in optical communication with light valve 36. In some embodiments, the at least one second reflector may also be in optical communication with the at least one reflector 42. The images captured by second lens 40 may be transmitted from the at least one reflector 42 to the at least one second reflector and may be reflected therefrom and transmitted to light valve 36. In some embodiments, the at least one second reflector may be in optical communication with first lens 32 and may be configured to transmit images from first lens 32 to light valve 36.

Figure 2B:
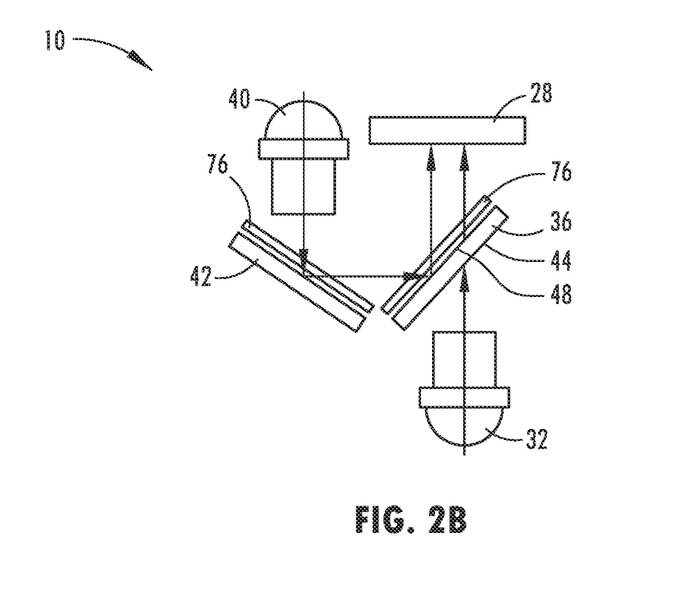
FIG. 2B illustrates a diagram of an embodiment of the imaging system.

In some embodiments, imaging system 10 may comprise at least one additional polarizer 76, as shown in FIG. 2B. The at least one polarizer 76 may be disposed in path of light coming from at least one of first and second lenses 32, 40. Polarizer 76 may be disposed between the at least one reflector 42 and light valve 36 and/or between light valve 36 and image sensor 28. Polarizer 76 may prevent both views from reaching image sensor 28 at the same time when light valve 36 is in a state in which light from first lens 32 passes through light valve 36.

In some embodiments, three or more lenses may be used with image sensor 28. Reflectors 42 may be associated with at least some of the lenses and may be configured to direct the images captured by the associated lenses to light valve 36. In some embodiments, light valve 36 may alternate between allowing light from at least a first lens 32 to pass through the light valve 36 toward image sensor 28 and reflecting light from at least a second lens 40 toward image sensor 28. Image sensor 28 may be configured to switch from one lens to another or to alternate between two or more of the lenses. Image sensor 28 may be capable of producing three or more separate images, one image for each lens.

Figure 3:
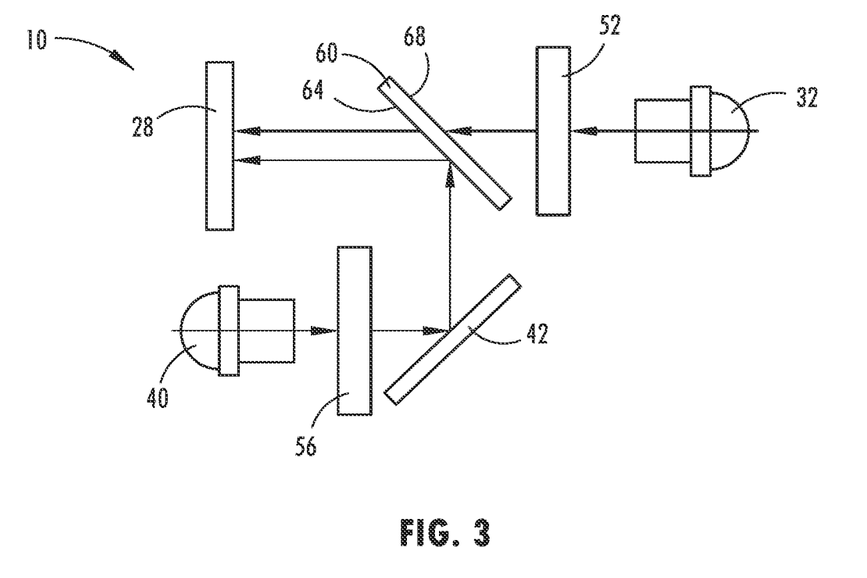
FIG. 3 illustrates a diagram of another embodiment of the imaging system disclosed herein.

FIG. 3 shows an embodiment of imaging system 10 comprising an image sensor 28, first lens 32, a first switchable shutter 52 associated with the first lens 32, at least one second lens 40, and at least one second switchable shutter 56, each of the at least one second switchable shutters associated with one of the at least one second lenses 40. Each of the first and second lenses 32, 40 may be configured to be selectively in optical communication with image sensor 28. First lens 32 may be configured to capture an image and transmit it to first switchable shutter 52, and second lens 40 may be configured to capture an image and transmit it to second switchable shutter 56. In some embodiments, first lens may be configured to capture images from a different field of view than images captured by at least one of the second lenses. Additionally or alternatively, in some embodiments, each lens may have a different focal length.

In some embodiments, imaging system 10 may further comprise a reflector 60 having a first surface 64 and a second surface 68 and disposed between first switchable shutter 52 and image sensor 28. Reflector 60 may comprise one of a transflective reflector, a partially reflective partially transmitting reflector, reflective polarizing mirror, polarizing or non-polarizing beam splitter or dichroic reflector. As shown, reflector 60 comprises a transflective reflector. First surface 64 of transflective reflector 60 may be configured to reflect light while second surface 68 of transflective reflector 60 may be configured to allow light that strikes it to pass through transflective reflector 60. As shown in FIG. 3, transflective reflector 60 may be configured to allow images from first lens 32 to pass through first switchable shutter 52 and through transflective reflector 60 to reach image sensor 28.

In some embodiments, a third lens (not shown) may be disposed between image sensor 28 and light valve 36. This may allow the use of a lens that does not have a long back focal length.

Each of first and second switchable shutters 52, 56 may comprise a plurality of independent pixels 72. Each of the independent pixels 72 may be independently controllable. When a pixel 72 is turned on, light may pass through the pixel 72, whereas, when a pixel 72 is turned off, light may be prevented from passing through pixel 72. In some embodiments, image sensor 28 may comprise a rolling shutter. The pixels 72 of each of the first and second switchable shutters 52, 56 may be configured to allow particular segments of a captured image to be exposed to image sensor 28, thereby supporting a method of switching between frames. Thus, a portion of an image captured by first lens 32 may pass through first switchable shutter 52 to transflective reflector 60. The image may then pass through transflective reflector 60 to image sensor 28.

In some embodiments, the imaging system 10 may further comprise at least one reflector, each of the at least one reflectors configured to redirect incoming light in a new direction. Each of the at least one reflectors may be associated with and in optical communication with one or more lenses. In some embodiments, the light may be re-directed toward the image sensor 28. In some embodiments, a plurality of reflectors may be disposed in series and configured to re-direct light from one of the plurality of lenses 32, 40 toward image sensor 28. Thus, images from second lens 40 may pass through second switchable shutter 56, be redirected by a first reflector 42, and be redirected a second time by transflective reflector 60 to image sensor 28.

First lens 32 may be configured to capture an image from a first field of view having a first focal length. The image captured by first lens 32 may be transmitted to first switchable shutter 52. The portion of the captured image that passes through first switchable shutter 52 may be transmitted to first reflector 42. In some embodiments, first reflector 42 may be configured to re-transmit the transmitted portions of the image to image sensor 28.

Similarly, second lens 40 may be configured to capture an image from a second field of view having a second focal length. In some embodiments, second field of view may be different from first field of view. In some embodiments, second focal length may be different from first focal length. The image captured by second lens 40 may be transmitted to second switchable shutter 56. The portion of the captured image that passes through second switchable shutter 56 may be transmitted to a second reflector (not shown). In some embodiments, second reflector may be configured to re-transmit the transmitted portions of the image to image sensor 28. In some embodiments, second reflector may be configured to re-transmit the transmitted portions of the image to first reflector 42, from which the re-transmitted portions of the image may be transmitted again, this time to image sensor 28.

Figure 4A:
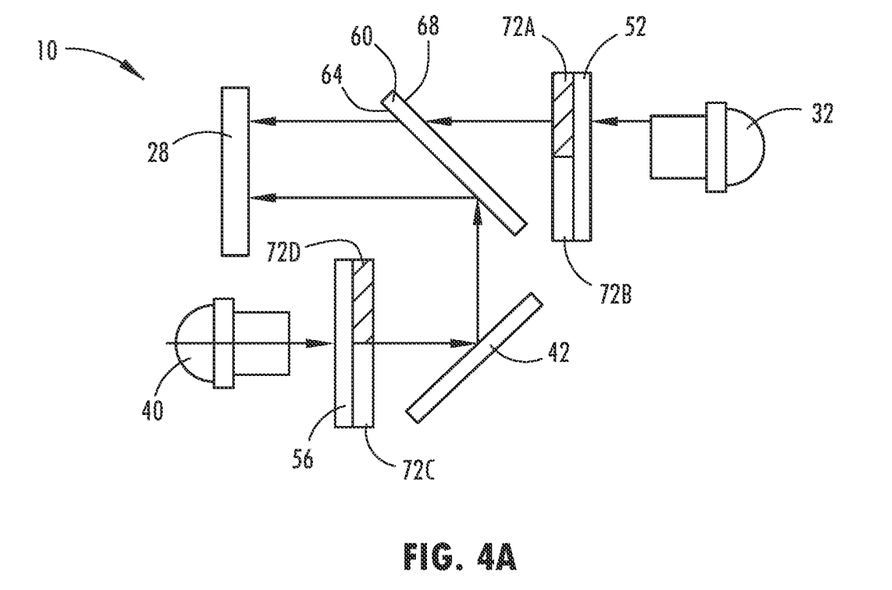
FIG. 4A illustrates a diagram of a first state of the imaging system illustrated in FIG. 3.
Figure 4B:
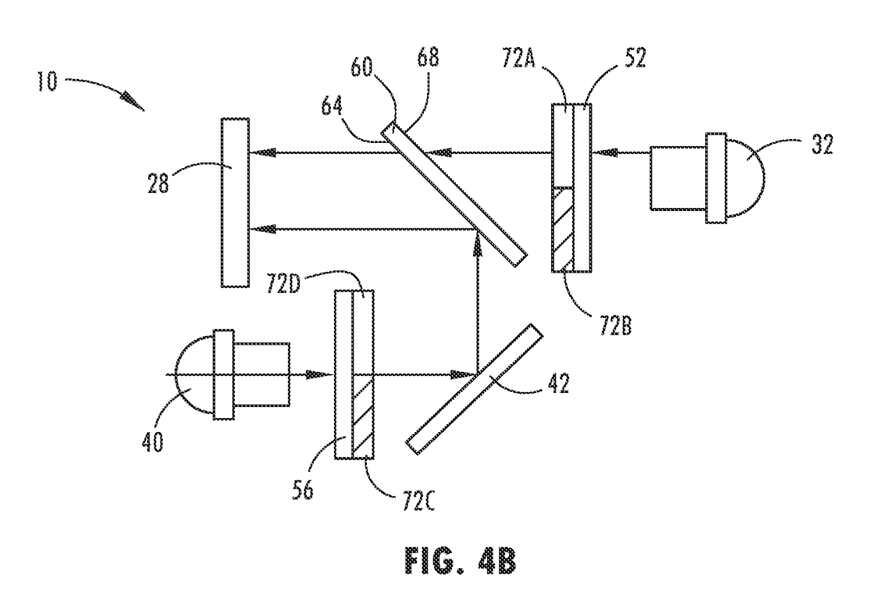
FIG. 4B illustrates a diagram of a second state of the imaging system illustrated in FIG. 3.

Each of first and second switchable shutters 52, 56 may be configured to allow a first portion of the captured image to pass through switchable shutter while simultaneously blocking a second portion of the captured image, thereby preventing the second portion of the captured image from passing through switchable shutter. In some embodiments, as shown in FIGS. 4A and 4B, first lens 32 of imaging system 10 may be associated with first switchable shutter 52 and second lens 40 may be associated with second switchable shutter 56. Each of first and second switchable shutters 52, 56 may have a plurality of pixels 72. For illustrative purposes, first and second switchable shutters 52, 56 are each shown with two pixels 72, but more pixels 72 may be used and still remain within the scope of this disclosure. As used herein, the term pixel 72 may refer to a single pixel 72 or to a portion of the plurality of pixels 72 in the switchable shutter 52, 56.

In operation, in a first state, as shown in FIG. 4A, a first pixel 72 of first switchable shutter 52 may be configured to block a portion of the light travelling from first lens 32 toward image sensor 28 by, for example, turning off first pixel 72*a*, thereby preventing light from passing through first pixel 72*a*. A second pixel 72*b* of first switchable shutter 52 may be configured to allow light exiting first lens 32 to pass through second pixel 72*b* of first switchable shutter 52. After travelling through second pixel 72*b* of first switchable shutter 52, light may travel through transflective reflector 60 to image sensor 28.

Also in the first state, a first pixel 72*c* of second switchable shutter 56 may be configured to allow light leaving second lens 40 to travel through second switchable shutter 56, be reflected first by reflector 42, then be reflected by transflective reflector 60, and finally travel to image sensor 28. A second pixel 72*d* of second switchable shutter 56 may be configured to block light leaving second lens 40, preventing it from passing through second switchable shutter 56.

In a second state, as shown in FIG. 4B, first pixel 72*a* of first switchable shutter 52 may be configured to allow light leaving first lens 32 to pass through first switchable shutter 52 and, from there, through transflective reflector 60 to image sensor 28. Second pixel 72*b* of first switchable shutter 52 may be configured to block light leaving first lens 32 toward image sensor 28, preventing it from passing through first switchable shutter 52.

Simultaneously, first pixel 72*a* of second switchable shutter 56 may be configured to prevent light leaving second lens 40 from passing through first pixel 72*a*. Second pixel 72*b* of second switchable shutter 56 may be configured to allow light leaving second lens 40 to pass through second switchable shutter 56, be re-directed by reflector 42, be re-directed again by transflective reflector 60, and strike image sensor 28.

The first and second switchable shutters 52, 56 may operate in sync with one another. For example, when first pixel 72*a* of first switchable shutter 52 is configured to block light and second pixel 72*b* of first switchable shutter 52 is configured to allow light to pass through, first pixel 72*c* of second switchable shutter 56 may be configured to allow light to pass through the shutter and second pixel 72*d* of second switchable shutter 56 may be configured to block light from passing through. When first switchable shutter 52 switches so that first pixel 72*a* of first switchable shutter 52 is configured to allow light to pass through and second pixel 72*b* of first switchable shutter 52 is configured to block the passage of light through second pixel 72*b*, second switchable shutter 56 may simultaneously switch so that first pixel 72*c* of second switchable shutter 56 is configured to block light from passing through and second pixel 72*d* of second switchable shutter 56 is configured to allow light to pass. In some embodiments, imaging system 10 may rapidly alternate between first and second states.

Having one or more pixels 72 in each switchable shutter turned off at any given time may prevent photons from one lens from showing up on an image from another lens. Thus, turning off a particular pixel 72 from first lens 32 during a particular time period while simultaneously turning on a particular pixel 72 from second lens 40 may avoid contamination of the image.

In some embodiments, each of the first and second switchable shutters 52, 56 may be configured to switch rapidly, for example, between 30 and 240 Hz, or at about 120 Hz, between first state and second state. For example, first and second switchable shutters 52, 56 may both comprise a liquid crystal element. The rapid switching speed of the first and second switchable shutters 52, 56 may allow image sensor 28 to alternate between processing a first image coming from first lens 32 and a second image coming from second lens 40. Thus, although each of first and second lens 40 are continuously capturing images, only a portion of the image from each lens is transmitted to image sensor 28 at a time. A processor associated with image sensor 28 may be configured to interleave the images, resulting in two complete images.

In some embodiments, a rapid shutter switching speed may not be required. In some cases, an imaging system 10 may require shutters to switch only once or a limited number of times. For example, imaging system 10 may be used to authenticate a driver prior to starting a vehicle 20, then be used for driver assistance or driver monitoring. Thus, first lens 32, having a first field of view and a first focal length, may capture the driver characteristic required for authentication. After the driver has been authenticated, imaging system 10 may begin processing images from second lens 40, which may have a second field of view and a second focal distance. Since imaging system 10 may only switch one time between first lens 32 and second lens 40, a rapid switching speed may not be required, and first and second switchable shutters 52, 56 may have a relatively slow shutter speed. In this case, first and second switchable shutters 52, 56 may comprise a liquid crystal element, or alternatively an electro-chromic device, a reversible electroplated mirror, or a MEMS device.

In some embodiments, imaging system 10 may comprise a first lens 32, a light valve 36, and an image sensor 28. Imaging system 10 may be configured to alternate between a mirror phase displaying an image reflected in a mirror and a camera phase showing an image captured by lens. In this embodiment, first lens 32 may be configured to alternate between transmitting a captured image and not transmitting the image. Light valve 36 may comprise a liquid crystal element or an elector-chromic element.

In some embodiments, imaging system 10 may comprise a first lens 32, a light valve 36, a reflector 42, and an image sensor 28. Reflector 42 may be curved so as to provide the appropriate focusing power, thereby allowing reflector 42 to act as a lens. Light may enter imaging system 10 from a first direction and pass through first lens 32 through light valve 42 and, from there, to image sensor. Light may enter imaging system 10 from a second direction, be focused by curved reflector 42, directed to light valve 36 and, from there, directed to image sensor 28. This arrangement may allow imaging system 10 to operate with fewer components.

Although a curved reflector 42 may not perform as well as a lens, this arrangement may be used when image quality is not critical.

Although imaging system 10 is shown having two lenses and two switchable shutters, imaging system 10 may comprise three or more lenses and three or more switchable shutters and still be within the scope of the disclosure. When three or more lenses are used, imaging system 10 may also comprise a sufficient number of reflectors 42 to allow collected images to be transmitted to image sensor 28.

Figure 5:
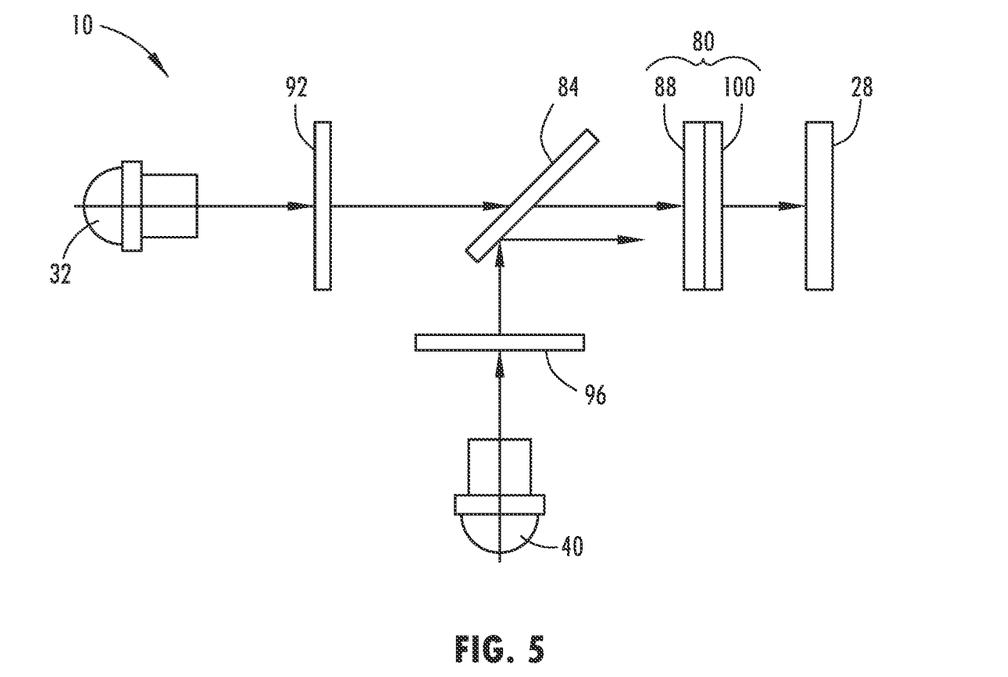

Referring now to FIG. 5, in some embodiments, imaging system 10 may comprise a single image sensor 28, at least one polarization selector/rotator 80, and at least one combiner 84. Combiner 84 may comprise one of a transflective mirror, a reflective polarizing mirror, a polarizing beam splitter or combiner, a nonpolarizing beam splitter or combiner, or a dichroic mirror. Combiner 84 may be configured to direct light from both first and second lenses 32, 40 toward image sensor 28.

Polarization selector/rotator 80 may be disposed between image sensor and liquid crystal element 88 and may be generally parallel to liquid crystal element 88. Polarization selector/rotator 80 may comprise a switchable waveplate. Polarization selector/rotator 80 may be configured to polarize the incoming light beam. Polarization selector/rotator may comprise a liquid crystal element 88 arranged in proximity to image sensor. In some embodiments, liquid crystal element 88 may comprise an active switchable half-wave waveplate. Polarization selector/rotator may further comprise a linear polarizer 100.

Imaging system may further comprise first lens 32 configured to collect light from a first field of view and a second lens 40 configured to collect light from a second field of view. In some embodiments, first field of view and second field of view may partially or completely overlap one another. Alternatively, in some embodiments, there may be no overlap between the first and second fields of view.

In some embodiments, imaging system further comprises a first linear polarizer 92 disposed between first lens 32 and combiner 84 and a second linear polarizer 96 disposed between second lens 40 and combiner 84. First linear polarizer 92 may be configured to polarize light in first direction and second linear polarizer 96 may be configured to polarize light in a second direction perpendicular to the first direction.

In use, light may enter at least one of first lens 32 and second lens 40. Light entering first lens 32 may be polarized by first linear polarizer in a first direction, and light entering second lens 40 may be polarized in a second direction orthogonal to first direction by second linear polarizer. Light from both first and second lenses 32, 40 may enter combiner 84. As shown, light from first lens 32 passes through combiner 84 and light from second lens 40 is reflected by combiner 84 to travel in the same direction as light from first lens 32, although other arrangements may be used and still be within the scope of this disclosure.

Light leaving combiner 84 may pass through liquid crystal element 88 of polarization selector/rotator 80. Liquid crystal element 88 may be configured to have a first state and a second state. In the first state, liquid crystal element 88 may be configured to allow light having a first polarization to pass through while absorbing light having other polarizations. In the second state, liquid crystal element 88 may be configured to allow light having a second polarization to pass through while absorbing light having other polarizations. Liquid crystal element 88 may be configured to alternate between first state and second state, thereby alternately allowing light having a first polarization and light having a second polarization to alternately pass through. Once light has passed through liquid crystal element 88, it may pass through linear polarizer 100 of polarization selector/rotator 80 to image sensor 28. Image sensor 28 may alternately capture image data from images received from first lens 32 and from second lens 40.

Figure 6:
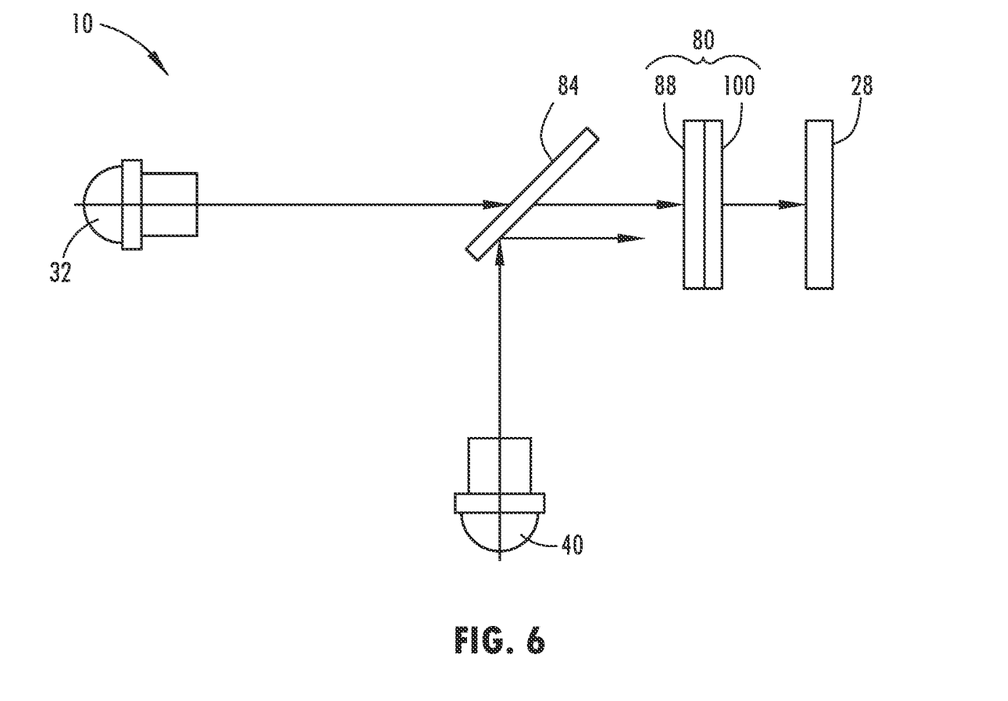
FIG. 6 illustrates a diagram of another embodiment of the imaging system disclosed herein.

In some embodiments, as shown in FIG. 6, combiner 84 may comprise a polarizing beam splitter. In this embodiment, first and second linear polarizers may not be necessary, and imaging system 10 may comprise combiner 84 in optical communication with image sensor 28, polarization selector/rotator 80, and first and second lenses 32, 40 in optical communication with combiner 84.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

The invention claimed is:

1. An imaging system for use in a vehicle, the imaging system comprising:
   a first lens mounted in the vehicle with a first field of view and a first focal length to capture a particular biometric feature of a driver of the vehicle;
   a second lens mounted in the vehicle with a second field of view and having a second focal length to capture larger images of the driver;
   at least one light valve; and
   an image sensor for receiving light from the light valve;
   wherein light from the first lens is projected onto the light valve; and
   wherein light from the second lens is projected onto the light valve,
   wherein the light valve is controlled to select light from either the first lens or the second lens to project onto the image sensor, the light from the first lens is selected to authenticate the driver, and the light from the second lens is selected to monitor the driver for a driver monitoring system.

2. The imaging system of claim 1, wherein the light valve is a switchable reflective polarizer and is configured to have a first polarization state and a second polarization state;
   wherein the first polarization state allows light to pass through the switchable reflective polarizer; and
   wherein the second polarization state reflects light that strikes the switchable reflective polarizer.

3. The imaging system of claim 2, wherein the switchable reflective polarizer is configured to alternate between the first polarization state and the second polarization state.

4. The imaging system of claim 3, wherein the image sensor is configured to interleave images received from the first lens and the second lens.

5. The imaging system of claim 2, wherein, when the switchable reflective polarizer is in the first polarization state, the imaging system is configured to cause images from the first lens to be transmitted to the image sensor.

6. The imaging system of claim 2, wherein, when the switchable reflective polarizer is in the second polarization state, the imaging system is configured to cause images from the second lens to be transmitted to the image sensor.

7. The imaging system of claim 1, further comprising at least one reflector;
wherein each of the at least one reflectors is associated with one of the first and second lenses.

8. The imaging system of claim 2, further comprising at least one reflector;
wherein each of the at least one reflectors is associated with one of the first and second lenses, and
wherein at least one of the at least one reflectors is configured to re-direct images from the lens associated with the at least one reflector to the switchable reflective polarizer.

9. The imaging system of claim 1, wherein the first field of view is different from the second field of view.

10. The imaging system of claim 1, wherein the first focal length is different from the second focal length.

11. An imaging system for use in a vehicle, the imaging system comprising:
a first lens mounted in the vehicle with a first field of view and a first focal length to capture a particular biometric feature of a driver of the vehicle;
a first switchable shutter associated with the first lens;
a second lens mounted in the vehicle with a second field of view and having a second focal length to capture larger images of the driver;
a second switchable shutter associated with the second lens; and
an image sensor for receiving images from both the first and the second lenses through the respective first and second switchable shutters,
wherein the first and second switchable shutters are controlled to select light from either the first lens or the second lens to project onto the image sensor, the light from the first lens is selected to authenticate the driver, and the light from the second lens is selected to monitor the driver for a driver monitoring system.

12. The imaging system of claim 11, wherein the first and second switchable shutters each comprise a plurality of independently controllable pixels; and
wherein turning one of the pixels on allows light to pass through the pixel and allows a particular segment of an image captured by the associated lens to be exposed to the image sensor; and
wherein turning one of the pixels off prevents light from passing through the pixel.

13. The imaging system of claim 11, further comprising at least one reflector;
wherein each of the at least one reflectors is associated with one of the first and second lenses; and
wherein each of the at least one reflectors is configured to direct light from the associated lens in a new direction.

14. The imaging system of claim 11, further comprising at least one transflective reflector;
wherein the transflective reflector is configured to allow light from the first lens and the first switchable shutter to pass through the transflective reflector; and
wherein the transflective reflector is configured to reflect light coming from the second lens and the second switchable shutter.

15. The imaging system of claim 11, wherein the first field of view is different from the second field of view and the first focal length is different from the second focal length.

16. An imaging system for use in a vehicle, the imaging system comprising:
a first lens mounted in the vehicle and configured to collect light from a first field of view at a first focal length to capture a particular biometric feature of a driver of the vehicle;
a second lens mounted in the vehicle and configured to collect light from a second field of view at a second focal length to capture larger images of the driver;
a combiner;
a light valve; and
an imaging sensor for receiving images from each of the first and second lenses, through the combiner, and the light valve,
wherein the light valve is controlled to select light from either the first lens or the second lens to project onto the imaging sensor, the light from the first lens is selected to authenticate the driver, and the light from the second lens is selected to monitor the driver for a driver monitoring system.

17. The imaging system of claim 16, wherein the light valve comprises a polarization selector/rotator comprising a liquid crystal element, a linear polarizer, and a switchable waveplate.

18. The imaging system of claim 17, further comprising a first linear polarizer receiving light from the first lens and a second linear polarizer receiving light from the second lens, and wherein the first linear polarizer and the second linear polarizer project light onto the combiner.

19. The imaging system of claim 16, wherein the combiner comprises one of a transflective mirror, a reflective polarizing mirror, a polarizing beam splitter or combiner, a nonpolarizing beam splitter or combiner, or a dichroic mirror.

* * * * *

UNITED STATES PATENT AND TRADEMARK OFFICE
CERTIFICATE OF CORRECTION

PATENT NO. : 12,298,500 B2  
APPLICATION NO. : 17/618602  
DATED : May 13, 2025  
INVENTOR(S) : Joshua D. Lintz et al.

Page 1 of 1

It is certified that error appears in the above-identified patent and that said Letters Patent is hereby corrected as shown below:

In the Claims

Column 14, Line 29, "lenses, through the combiner," should be --lenses through the combiner--.

Signed and Sealed this  
Eighth Day of July, 2025

Coke Morgan Stewart  
*Acting Director of the United States Patent and Trademark Office*